Patented Aug. 17, 1954

2,686,814

UNITED STATES PATENT OFFICE 2,686,814

PRODUCTION OF ANTIOXIDANTS

David G. Jones, Norton-on-Tees, England, assignor to Imperial Chemical Industries Limited, a corporation of Great Britain No Drawing. Application May 7, 1951,
Serial No. 225,055

Claims priority, application Great Britain
May 25, 1950

1 Claim. (Cl. 260—601)

This invention relates to inhibitors of oxidation, peroxidation, polymerisation and gum formation in petrols, aldehydes, fatty oils, vegetable oils, lubricating oils, ethers and similar compounds.

When, for example, liquid aldehydes are allowed to stand in contact with air, there is a tendency for them to be oxidised with the production of the corresponding acids. This oxidation may occur irrespective of the nature of the material of the container in which the aldehyde is stored, and may even be accelerated thereby.

In a similar manner, ethers tend to undergo an addition of oxygen on storage, with the formation of peroxides and/or hydroperoxides.

Acidity developed in an aldehyde may result in storage difficulties and may also be disadvantageous in many processes in which the aldehyde may be used, for example, in the production of synthetic resins, or in the hydrogenation to an alcohol. Similarly, ether peroxidation is undesirable because in some cases ether peroxides are highly explosive.

Also, the prevention of oxidation, in petrols, vegetable oils, and lubricating oils may inhibit gum formation in these compounds.

As a feature of the present invention we have now found that $3.3^1.5.5^1$-tetra-alkyl diphenoquinones have an inhibitory effect on the undesirable oxidation, polymerisation and gum formation reactions described above. In particular, it is preferred for each of the alkyl groups to contain not more than eight carbon atoms. The amount of diphenoquinone introduced into the aforementioned substances in order to prevent undesirable oxidation and polymerisation reactions may be varied over a wide range and will depend on the nature of the substance and the conditions to which it is to be exposed. For example, the addition of 0.001 to 1% of these inhibitors, based on the weight of the substance to be stabilised, is in general satisfactory for compounds such as petrols, aldehydes, for example nonaldehyde, fatty oils, vegetable oils, lubricants, and ethers, for example, tetrahydrofuran.

According to another feature of the present invention, there is provided a process for the production of a $3.3^1.5.5^1$ tetra-alkyl diphenoquinone, which comprises the step of subjecting a 2:6-dialkyl phenol to oxidation.

Suitable starting materials for use in the process of the present invention are, for example, 2-methyl-6-tertiary butyl phenol, 2:6-di-tertiary butyl phenol, and 2-methyl-6-($1^1.1^1.3^1.3^1$-tetramethyl butyl) phenol.

A range of oxidising agents may be used in the production of the quinones, but it is preferred to employ either nitric acid or chromic acid. The oxidation may be carried out within a wide temperature range, the actual temperature used depending upon the phenol to be oxidised. Thus 2-methyl-6-tertiary butyl phenol may be satisfactorily oxidised with nitric acid at room temperature, whereas in the oxidation of 2-methyl-6-($1^1.1^1.3^1.3^1$ tetramethylbutyl)-phenol with chromic acid, it is preferred to use an elevated temperature, for example, 100° to 120° C.

According to yet another feature of the present invention, new diphenoquinones are provided. These have a structure:

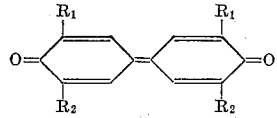

in which $R_1$ and $R_2$ are alkyl groups.

In particular, the following new compounds have been prepared:

(a) $3.3^1$-dimethyl $5.5^1$-ditertiary butyl diphenoquinone:

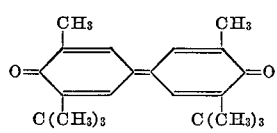

This compound crystallises in puce-coloured plates, which melt at 200° C.

(b) $3.3^1$ - dimethyl $5.5^1$-di($\alpha\alpha\gamma\gamma$ - tetramethylbutyl)-diphenoquinone:

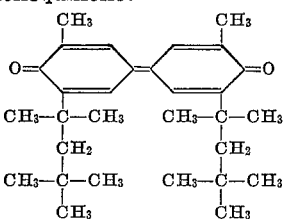

This compound crystallises in purple-red crystalline plates, which melt at 213° C.

(c) $3.3^1.5.5^1$-tetra-tertiary - butyl diphenoquinone:

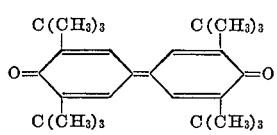

This compound crystallises as brown needles, melting at 240° C.

Example 1

16.4 gms. of 2-methyl-6-tertiary butyl phenol were dissolved in 60 mls. of glacial acetic acid and 23 mls. of 30% by weight nitric acid were added. The mixture was stirred and cooled and in this way the temperature was not allowed to exceed 20° C. A red gum was precipitated and on standing this solidified to a red powder. This was separated by filtration, dried, and recrystallised from aqueous acetic acid as glistening puce-coloured plates melting at 200° C. This compound was identified as $3.3^1$-dimethyl $5.5^1$-ditertiary butyl diphenoquinone. This compound was obtained in a 47% yield.

Example 2

0.6 gm. of 2-methyl-6-$(1^1.1^1.3^1.3^1$-tetramethyl butyl) phenol was dissolved in 3 mls. of glacial acetic acid and to the boiling solution, a solution of chromic acid containing 0.5 gm. $CrO_3$ in 3 mls. glacial acetic acid and 3 mls. water, was added. The precipitate was filtered, dried, and recrystallised from benzene as purple-red plates melting at 213° C. This compound was identified as $3.3^1$-dimethyl $5.5^1$-di($\alpha\alpha\gamma\gamma$-tetramethyl butyl)-diphenoquinone. It was obtained in a yield of 80%.

Example 3

2.0 gms. of 2.6-di-tertiary butyl phenol was dissolved in 7 mls. of glacial acetic acid, and 3 mls. of water, and gently boiled. 2 gms. of chromic acid dissolved in a mixture of 2 mls. of glacial acetic acid and 5 mls. of water were slowly added to the solution. The oxidation reaction was smooth and rapid. The product was precipitated almost immediately after the addition of the oxidising agent. It was separated by filtration, and washed with water. On recrystallisation from glacial acetic acid, brown needles melting at 240° C. were obtained. The analysis of this substance corresponded to $3.3^1.5.5^1$-tetra-tertiary butyl diphenoquinone.

Example 4

Three 15 ml. portions of nonaldehyde were exposed to atmospheric oxidation at room temperature. Two of the portions contained 0.00033 mole of an inhibitor, while the third served as a standard for comparison. The extent of oxidation was measured by the development of acidity in these samples. Thus, the acid values given in the table below refer to the milligrams of potassium hydroxide required to neutralise the acid formed per one gram of nonaldehyde.

| Inhibitor: | Acid value after 432 hours |
|---|---|
| None | 332 |
| $3.3^1$ dimethyl-$5.5^1$-di-tertiary butyl diphenoquinone | 69 |
| $3.3^1$ dimethyl - $5.5^1$-di($\alpha\alpha\gamma\gamma$-tetramethyl butyl)-diphenoquinone | 53 |

I claim:

A new composition of matter comprising nonaldehyde subject to deterioration arising from peroxide formation, together with, as an inhibitor of such deterioration, from 0.001% to 1% by weight of a 3.3'.5.5'-tetra-alkyl diphenoquinone selected from the group consisting of 3.3'-dimethyl-5.5'-di-tertiary butyl diphenoquinone, 3.3'-dimethyl - 5.5' - di($\alpha\alpha\gamma\gamma$-tetramethyl butyl) diphenoquinone and 3.3'.5.5'-tetra-tertiary butyl diphenoquinone.

References Cited in the file of this patent

UNITED STATES PATENTS

| Number | Name | Date |
|---|---|---|
| 2,090,484 | Ostromislensky | Aug. 17, 1937 |
| 2,351,347 | Luten | June 19, 1944 |
| 2,449,088 | Smith | Sept. 14, 1948 |
| 2,497,097 | Roberts et al. | Feb. 14, 1950 |